United States Patent [19]

Williams et al.

[11] Patent Number: 4,558,874
[45] Date of Patent: Dec. 17, 1985

[54] VALVE STEM PACKING ASSEMBLY

[75] Inventors: Peter C. Williams, Cleveland Heights; Ulrich H. Koch, Bainbridge Township, Ross County; Edward M. Yusko, Jr., Cleveland; Thomas M. Mannion, University Heights, all of Ohio

[73] Assignee: Whitey Co., Highland Heights, Ohio

[21] Appl. No.: 510,884

[22] Filed: Jul. 5, 1983

[51] Int. Cl.[4] .................. F16J 15/18; F16K 41/04
[52] U.S. Cl. ........................ 277/112; 277/116.2; 277/121; 277/190; 277/DIG. 6; 251/214
[58] Field of Search ............ 277/116.2, 116.4, 112, 277/116.6, 116.8, 117–122, 190, DIG. 6; 251/214

[56] References Cited

U.S. PATENT DOCUMENTS

| | | | |
|---|---|---|---|
| 607,429 | 7/1898 | Farley | 277/117 X |
| 1,174,588 | 3/1916 | King | 277/122 |
| 1,285,286 | 11/1918 | McCracken | 251/214 |
| 1,795,570 | 3/1931 | Nilson | |
| 1,873,859 | 8/1932 | Bailey | 277/122 |
| 2,110,098 | 3/1938 | Strecker | 251/103 |
| 2,194,265 | 3/1940 | Abercrombie | 166/14 |
| 2,912,266 | 11/1959 | Nordell | 286/31 |
| 2,981,284 | 4/1961 | Putnam | 251/214 X |
| 3,039,780 | 6/1962 | Nordell | 277/125 |
| 3,108,018 | 10/1963 | Lewis | 117/161 |
| 3,164,362 | 1/1965 | Lavigueur | 251/174 |
| 3,168,279 | 2/1965 | Anderson et al. | 251/181 |
| 3,239,191 | 3/1966 | Widera | 251/288 |
| 3,289,694 | 12/1966 | Frye | 251/214 X |
| 3,371,676 | 3/1968 | Mullaney, III | 251/214 X |
| 3,387,815 | 6/1968 | Richards | 251/174 |
| 3,567,178 | 3/1971 | Nelson | 251/214 |
| 3,717,323 | 2/1973 | Geipel | 251/315 |
| 3,753,569 | 8/1973 | Bonomi | 277/117 X |
| 3,883,112 | 5/1975 | Milleville et al. | 251/174 |
| 4,006,881 | 2/1977 | Gaillard | 251/214 |
| 4,026,517 | 5/1977 | Still | 251/214 |
| 4,230,325 | 10/1980 | Butler et al. | 277/117 |
| 4,317,573 | 3/1982 | Karkkainen | 251/214 X |
| 4,364,542 | 12/1982 | Meyer | 251/214 |

FOREIGN PATENT DOCUMENTS

| | | | |
|---|---|---|---|
| 177538 | 11/1906 | Fed. Rep. of Germany | 277/120 |
| 2816930 | 10/1979 | Fed. Rep. of Germany | 277/118 |
| 402081 | 1/1912 | France | 277/117 |
| 1102582 | 5/1955 | France | 277/190 |
| 1109113 | 9/1955 | France | 277/190 |
| 2037402 | 7/1980 | United Kingdom | 251/214 |

Primary Examiner—Robert S. Ward
Attorney, Agent, or Firm—Fay, Sharpe, Fagan, Minnich & McKee

[57] ABSTRACT

A valve body has a stem passage rotatably receiving a valve stem. A packing surrounds the stem in the passage and a packing nut threaded on the stem applies axial force to radially expand the packing into sealing engagement with the stem and passage wall. The packing comprises cooperating first and second packing members engaging at an angularly disposed slippage surface for translation of compressive axial forces into radial expansion and sealing engagement with the stem and passage wall. A packing support ring engages the end face of the packing adjacent the packing nut. A gland engages the support ring and a pair of reversely positioned spring washers are interposed between the gland and packing nut. A handle is attached to the stem by a handle nut, and a spring washer interposed between the handle and handle nut prevents loosening of the handle nut. In an alternate embodiment of the invention, opposed packing support rings engage the opposed end faces of the first and second packing members. The support rings include chevron surfaces for radially expanding the packing members and the support ring adjacent the packing nut includes notches in the chevron surface for gripping the packing member to prevent relative sliding movement therebetween.

10 Claims, 7 Drawing Figures

VALVE STEM PACKING ASSEMBLY

BACKGROUND OF THE INVENTION

This application relates to the art of valves and, more particularly, to valve stem packing assemblies for quarter turn valves such as ball, plug or butterfly valves.

The two purposes of stem packing assemblies for quarter turn, half turn and similar valves are to seal the passage through which the rotatable stem penetrates the valve body and to provide a bearing for carrying the internal pressure load acting on the stem. These two purposes apply to stem packing assemblies for all kinds of quarter turn, half turn and similar valves, including ball, plug or butterfly. The requirements differ from other valves in that the motion is pure rotation for only a partial turn and there is no axial motion.

The most basic stem packing approach comprises an O-ring seal. Such a seal is simple to produce, small, compact, inexpensive, and effective in many non-demanding applications.

A more sophisticated approach uses a bushing of Teflon (a trademark of E. I. duPont de Nemours and Company for polytetrafluoroethylene materials). This is probably the most common type of construction, and means is typically provided for compressing the bushing. This approach requires a somewhat more bulky assembly, and is more expensive and more complex as compared to an O-ring. However, the Teflon bushing arrangement can be used with a wider variety of chemicals and usually over a much wider temperature range as compared to O-rings.

A third approach uses a high temperature material other than Teflon, such as asbestos or Grafoil (a trademark of Union Carbide Corporation for an expanded flexible carbonaceous material having no resin or organic binders). These arrangements are generally too expensive and not sufficiently reliable for general use, and are usually reserved for high temperature applications.

All of the above seal arrangements operate to seal the valve stem passage by imparting an axial force to the packing assembly to axially compress the packing materials to thereby force radially inward and outward deformation of the packing materials. Such deformation is designed to result in a sealing engagement of the packing with the stem and stem passage. The efficiency of the translation of the axial force into sealing radial expansion of the packing largely determines the effectiveness of the seal arrangement and the life of the seal over a number of valve cycling operations. Seal arrangements which particularly absorb axial force without radial deformation are undesirably inefficient and frequently demand adjustment to maintain the proper seal.

All of the above seal arrangements have certain limitations and undesirable characteristics depending upon the application. With O-rings, pressures and temperatures are restricted to moderate levels and useful ranges, and suitable materials for O-rings are incompatible with many chemicals and solvents.

Although Teflon is compatible with most chemicals, it is temperature limited. Asbestos or Grafoil can withstand high temperatures but are not as leaktight and reliable under normal conditions. Teflon, asbestos, and Grafoil wear out with cycling of the valve so the packing becomes loose and leaks, thus requiring frequent adjustment. Thermal cycling also causes the packings to become loose because the packing materials expand at different rates than metals. Teflon is particularly troublesome because it expands approximately ten times as fast as metal.

All of the above limitations exist with normal packing systems in normal service. When fire safety requirements are added, the limitations are much more serious because the packing must seal during and after a fire, and the valve must be operable, at least once or a few times, without leaking. The usual materials used for O-rings, Teflon and other nonmetallics, are destroyed during a fire, and are either completely consumed or leave only a charred residue. Even fire resistant materials can fail if the heat causes a small amount of shrinkage which, in turn, causes the packing to become loose.

Supporting the thrust load on the stem is done internally or externally, with internal support perhaps being the most common. In internal thrust loading, the stem includes a head having a shoulder for supporting a bearing. The stem is inserted from the inside of the body, and a bearing material is located between the stem shoulder and a flange on the body. This bearing carries the thrust load and allows the stem to rotate freely. The bearing arrangement is small, compact, inexpensive and the stem head makes the stem inherently blowout proof. The stem cannot blow out of the valve body under pressure even if all the external packing components are removed. However, internal bearings are subject to damage by process fluids.

A less common construction is an external thrust bearing, usually combined in some way with the stem packing. This requires some kind of external yoke construction which is larger, more expensive and, if it is removed or damaged in service, the stem can blow out under pressure. The main advantage is that it places the bearing outside the valve body, away from the system fluid, where it can be lubricated and constructed for maximum wear life. However, external bearings are exposed to contamination, dirt and corrosive atmospheres. In most quarter turn valves, the wear on the thrust bearing is rarely the factor which limits valve performance.

Bearing loads are also affected by packing adjustment. The packing load is usually applied by clamping against the bearing, and avoiding such clamping requires additional complex yoke devices on both internal and external bearing systems. Overtightening the packing, either by excessive manual adjustment or by thermal expansion, can overload the bearing. This situation causes even faster packing and bearing wear, shorter life, and further loosening.

It has been considered desirable to eliminate or minimize the foregoing limitations and undesirable characteristics in a simple, reliable, and inexpensive manner. The subject invention is considered to meet these needs and others by providing a new and improved valve stem packing assembly.

SUMMARY OF THE INVENTION

A valve body has a stem passage rotatably receiving a valve stem having an enlarged head on its inner end. The stem is inserted into the stem passage from inside the body and the peripheral back face of the head defines a shoulder or thrust bearing surface which cooperates with an inwardly extending flange adjacent the bottom of the stem passage.

A thrust washer interposed between the stem shoulder and the stem passage flange is comprised of metal to provide rigidity and in the event the valve is intended for firesafe operation, such a washer will survive highly elevated temperatures. The thrust washer is coated with Teflon on both faces to provide lubricity during normal service. The coating will be burned away during a fire, but it is so thin (0.001–0.002 inch) that the loss of axial dimension will not loosen the packing. While a coating is preferred, a very thin film could also be used. The thrust washer is of Nitronic 60 (a trademark of Armco, Inc. for stainless steel). This type of stainless steel does not gall when it slides against the metal body after a fire, or if the coating wears out in normal service.

In one embodiment of the invention, the packing itself is preferably comprised of a Teflon packing arrangement based upon primary application of the packing in normal valve service, as opposed to firesafe service. In this embodiment, the packing means surrounding the stem within the stem passage comprises telescoped first and second packing members arranged in slipping cooperation along an engagement surface for translation of axial forces imparted to the packing assembly to radial expansion thereof into sealing engagement with the passage and stem. A flat packing support ring is interposed between a support gland and the Teflon packing members. The support ring is preferably constructed of a polyimide plastic material and may or may not rotate with the stem. Preferably, the first packing member comprises a frusto-conical packing annulus which tapers towards the second packing member comprising a cylindrical packing annulus having an inner side wall for mating reception of the first packing member. The first and second packing members cooperate along the engagement surfaces to slip relative to one another dependent upon the extent of axial force imparted to the assembly. Such an arrangement efficiently translates axial force into radial deformation for an improved sealing engagement to the stem and stem passage.

In an alternate embodiment of the invention, the first and second packing members are comprised of Grafoil having a wire reinforcement, such as knitted wire of the type manufactured by Metex Corporation of Edison, N.J. The Grafoil seals well at normal operating temperature and also in a fire. Constructing the packing members of Grafoil is advantageous where the primary application of the valve is based upon firesafe service, as opposed to normal valve service where Teflon packing members are preferred. Grafoil does not undergo any gross size changes, such as severe shrinkage because of a fire. Its coefficient of thermal expansion is fairly close to those of metals, much closer than any plastics, so size changes during normal temperature changes and during a fire are manageable.

Wire reinforcement of the Grafoil provides it with strength, cohesiveness for wear resistance, and, most importantly, resiliance for thermal cycling. The wear life of Grafoil can be good under the proper conditions, but is is easily damaged. Ideally, the rubbing part should be very smooth as a rough surface will tear Grafoil and destroy it. The compressive load should be just high enough to seal, but no more. Excess load causes the Grafoil to adhere to the stem, tear off flakes, and wear out rapidly. Close clearances at each end are required to prevent extrusion of the Grafoil under pressure.

Upper and lower packing support rings are essential to make the Grafoil perform properly. Chevron shaped packing support rings wedge the Grafoil packing members radially against the stem and body to enhance the application of a sealing force in the desired radial direction.

The packing support rings are again constructed of a polyimide plastic material, such as Vespel (a trademark of E. I. duPont de Nemours and Company for specialty polyimide plastics having high temperature resistance). Making the support rings of Vespel instead of metal allows them to be constructed with an extremely close fit to the stem. If the Vespel rubs on the stem, it wears slightly but this produces no ill effect. Metal support rings would score the stem, damage the surface, and, in turn, damage the Grafoil wear surface. Hence, metal rings would require larger clearances with the stem and this is not desirable because close clearances are essential to prevent packing extrusion for maximum life.

Vespel also survives a fire. Even though Vespel is a synthetic and is carbonized by the heat, there is no size loss. Vespel also retains enough compressive strength to function during and after a fire. There are also other new polymers which do not melt, burn, or vaporize, and these may be used instead of Vespel.

A very important second function of the upper support ring in the alternate firesafe embodiment of the invention is to form the interface between the rotatably sliding parts. The handle or other actuator, nuts and other upper components must rotate with the stem while the packing remains stationary with the body. At some point, there must be an interface where relative rotational sliding motion occurs. Controlling the location of that interface is critical.

Sliding rotation of any part directly against the end face of the Grafoil is unacceptable because it causes very rapid wear of the Grafoil. Despite the wedging action of the Chevron shaped support rings, the axial stress on the Grafoil is higher than the radial stress forming the seal along the stem, so rotation of the stem relative to the Grafoil is acceptable at the radial interface. To prevent any sliding against the end face of the Grafoil, the upper support ring includes radial notches which lock into the Grafoil as it is compressed to prevent any sliding at that junction.

For both embodiments of the packing described above a metal ring gland bears against the upper support ring, and turns with the stem and slides on the ring. Vespel has good wear resistance and low friction, so its flat upper face makes a good bearing surface for the gland. Using a metal ring would preclude this solution for a rotational interface and would require some other controlled bearing area. The gland also provides a rigid backing for the Vespel support ring. The clearances for the gland are slightly larger to preclude rubbing of the metal surfaces, but still close enough to support the Vespel and prevent it from cracking at an unsupported edge.

At least one frusto-conicl spring washer interposed between the lower packing nut and the gland provides the entire packing assembly with elasticity. The lower packing nut is adjusted to compress the spring until it applies a controlled clamping force on the packing. Flexibility of the spring washer allows the system to absorb small dimensional changes from thermal expansion or wear without loosening or overtightening the packing and thereby provides a longer life seal without need for regular packing nut adjustment. Preferably, a pair of reversely positioned spring washers in series is employed.

The unique shape of the spring washers locks them to the flats of the valve stem, assuring that the spring washers always turn with the stem and prohibit sliding motion between the springs and handle. The outer edge of the lower spring bears on the gland. Since there is almost a line contact, the unit stress is very high as is the friction, effectively locking the spring and gland together. Thus, the gland turns with the spring washers and stem, and, in turn, must slide on the Vespel support ring. The packing nut bears on the outer edge of the upper spring washer to create a strong locking action and prevent the nut from loosening during cycling.

A handle and a stop plate are received on the stem and rest on the lower packing unit. Openings in the handle and stop plate are cooperatively shaped with the stem to preclude relative rotation of these two components with respect to the stem. The handle is secured to the stem by an upper handle nut. A third spring washer, identical to the two previously mentioned, is interposed between the handle and handle nut to lock the handle nut against rotation.

Cycling the valve with the handle will inevitably develop some looseness between the handle and stem flats due to clearances, tolerances, and some distortion from use. This will allow some small relative motion between the handle, stem and handle nut which would eventually unscrew the nut. The upper or third spring prevents such loosening.

Flats on the opening in the third spring limit its rotation but, as in the case of the handle, cannot prevent it entirely. The spring is purposely positioned with the inner edge disposed against the handle and the outer edge in engagement with the handle nut. The axial forces of the spring washer are equal and opposite at these two edges, as are the friction forces. The torque, however, is always greater at the outer edge because of the longer radius. Therefore, any relative motion will cause sliding at the inner radius, i.e., between the spring and handle first, before sliding at the nut. This effectively prevents the small motions of the handle from being transmitted to the handle nut and gradually loosening it.

The principal advantage of the present invention is the provision of an improved valve stem packing assembly which is small, compact, simple and economical to manufacture.

Another advantage of the invention is the provision of such an assembly which will work effectively with either Grafoil for firesafe use or ordinary Teflon packing for normal use.

Still another advantage of the invention is the provision of such an assembly which works equally well with high temperature materials for routine service at elevated temperatures.

Another advantage of the invention is the provision of a packing arrangement which efficiently translates axial forces imparted to the stem packing into radial sealing deformation to provide a long valve cycle life without need for regular packing nut adjustment.

Still other objects and benefits of the subject invention will become apparent to those skilled in the art upon a reading and understanding of the following detailed description.

BRIEF DESCRIPTION OF THE DRAWINGS

The invention may take physical form in certain parts and arrangements of parts, alternate embodiments of which will be described in detail in this specification and illustrated in the accompanying drawings which form a part hereof and wherein.

DETAILED DESCRIPTION OF THE INVENTION

Figure 1:
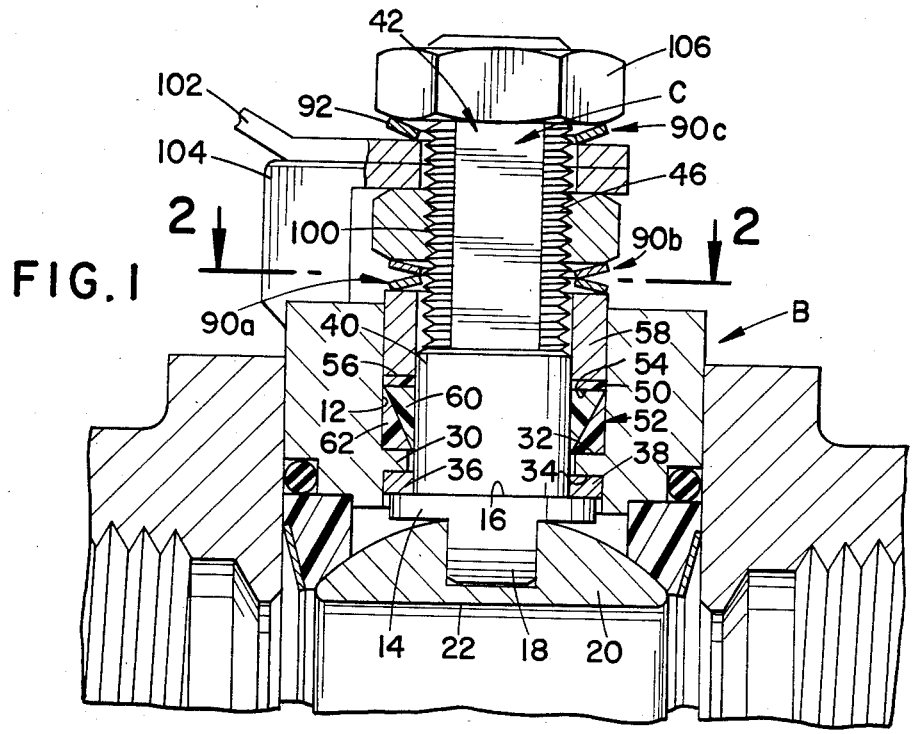
FIG. 1 is a cross-sectional elevational view of one embodiment of a valve stem and packing assembly constructed in accordance with the present invention.

Referring now to the drawings, wherein the showings are for purposes of illustrating embodiments of the invention only and not for purposes of limiting the same, FIG. 1 shows a valve body B having a cylindrical stem receiving passage 12 therein for rotatably receiving a valve stem C. Valve stem C includes an inner enlarged head 14 thereon providing a circumferential flat shoulder 16 on the rear surface thereof. Enlarged head 14 includes a transverse projection 18 received in a suitable groove in a valve member 20 having a valve passage 22 therethrough.

An inwardly extending circumferential flange 30 is provided in stem passage 12 adjacent the inner end thereof. Upper and lower flat flange surfaces 32,34 cooperate with various parts of the stem and packing assembly to retain the same in position. A thrust washer or bearing washer 36 is interposed between stem shoulder 16 and flange surface 34. A chamfer 38 extends around thrust washer 36 between the outer periphery and the flat surface thereof engaging flange surface 34. Chamfer 38 extends over substantially less than one-half the radial thickness of the washer between its inner and outer peripheries. In a preferred form, thrust washer 36 is of Nitronic 60 stainless steel and for lubricating is provided with a very thin coating or film between 0.001 and 0.002 inch thick of Teflon on its opposite flat end faces. It will be recognized that other materials could also be used depending upon the application for the valve. Also, one or both faces of the thrust washer advantageously may include V-shaped notches or the like for housing a supply of lubricant or lubricating material.

Valve stem C has a smooth cylindrical lower stem portion 40 and an elongated smaller diameter threaded stem portion 42. The stem also includes opposite flat stem surfaces 44, and opposite stem threaded surfaces 46 which are curved to lie on the periphery of a circle.

A packing support ring 50 is positioned at one end of cylindrical packing 52. The support ring 50 and packing 52 comprise an annulus assembly which surrounds stem portion 40 within stem passage 12, with flat end surface 54 of ring 50 engaging the packing 52. The opposed packing ring end surface 56 engages the cylindrical metal gland 58.

The packing comprises a first or upper packing member 60 and a second or bottom packing member 62 telescoped in cooperating slipping engagement with the first packing member along a mutual engagement surface for translation of axial force to radial expansion of the packing into sealing engagement with the passage 12 and the stem portion 40.

Figures 2, 3, 4, 5:
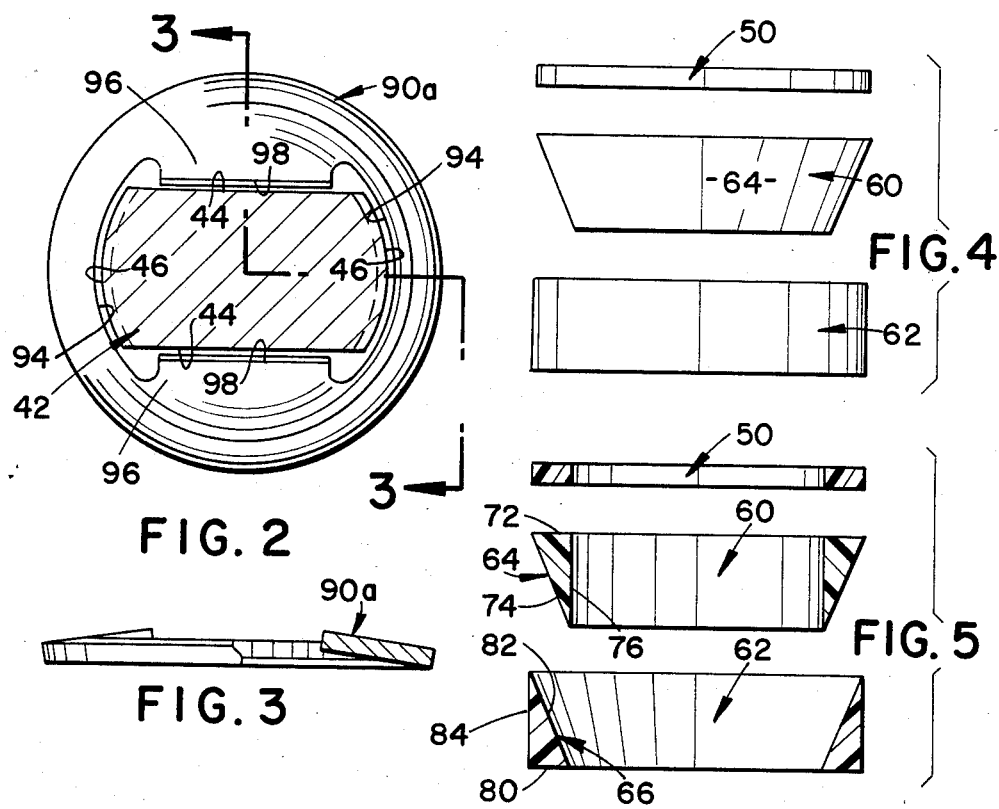
FIG. 2 is a partial cross-sectional plan view in enlarged scale taken generally along lines 2—2 of FIG. 1.
FIG. 3 is a cross-sectional elevational view taken generally along lines 3—3 of FIG. 2.
FIG. 4 is an exploded view in enlarged scale of the packing assembly of the stem and packing assembly of FIG. 1.
FIG. 5 is a cross-sectional exploded view of the packing assembly of FIG. 4.

With particular attention to FIGS. 1, 4 and 5, the slipping engagement between first packing member 60 and second packing member 62 occurs along first slippage surface 64 of the first packing member and second slippage surface 66 of the second packing member. The first and second slippage surfaces 64,66 mate with one another and are at least partially out of axial alignment with the stem passage 12 and the stem C such that the engaging slippage surfaces 64,66 are angularly inclined and out of generally parallel alignment with the stem passage wall and stem portion 40. The axial force that is imparted to the packing 52 is thus translated into radially expanding deformation. The first packing member 60 preferably comprises a frusto-conical packing annulus having an end wall 72, a first, radially-outer side wall 74 and a second, radially-inner side wall 76. The first side wall 74 depends from the end wall 72 towards the terminal end of the second side wall 76 to define the angularly inclined first side wall or slippage surface 64. Slippage surface 64 thus comprises an outer generally conical surface for mating reception in the second packing member 62. The second packing member preferably comprises a cylindrical packing annulus having an end wall 80, a first radially inner side wall 82, and a second radially outer side wall 84. The first side wall 82 depends from the end wall 80 towards the terminal end of the second end wall 84. Second slippage surface 66 thus comprises an inner generally conical surface for mating reception in the first packing member 60. At assembly the first packing member 60 and the second packing member 62 comprise a packing annulus having axially directed, radially inner and outer side walls which generally mate with the stem passage 12 and the stem portion 40 (FIG. 1).

Packing support ring 50 substantially engages the end wall 72 of the first packing member 60 to communicate axial force imparted through the packing gland 58 to the packing members 60,62. Since the packing members 60,62 are generally axially co-extensive, the terminal ends of the packing members 60,62 are in generally radial alignment to inhibit excessive slippage of the first packing member 60 within the second packing member 62. Imparting axial force to the packing members through support ring 50 generally directs further extension of the first packing member 60 into the second packing member 62 and consequent relative slippage along slippage surfaces 64,66 such that the second side wall 76 of the first packing member is urged into sealing engagement with stem portion 40 and the second side wall 84 of the second packing member 62 is simultaneously urged into sealing engagement with stem passage 12.

The cooperating packing members 60,62 thus provide radially-directed sealing engagement that is generally evenly distributed along the axial extent of the stem seal. Such a seal provides long valve stem seal cycle life without need for regular packing nut adjustment.

Packing support ring 50 has a flat end surface 56 engaged by a cylindrical metal gland 58. A pair of reversely positioned generally frusto-conical metal spring washers 90a,90b are received on threaded stem portion 42. As best shown in FIGS. 2 and 3, spring washer 90a is dished so its upper and lower surfaces are generally parallel and lie generally on the surfaces of cones. The concave under face of spring washer 90a intersects the outer periphery thereof at a circular outer peripheral edge 92. A central hole or opening through spring washer 90a provides inner peripheral edge portions at the intersection of the hole surfaces with the convex surface of the spring. Opposite curved inner peripheral edge portions 94 of spring washer 90a lie on the periphery of a circle having a diameter slightly larger than the diameter of the circle on which threaded stem surfaces 46 lie. Also, the spring washer includes opposite inwardly projecting extensions 96 with opposed flat or straight edges 98. The spacing between the opposed spring washer flat or straight edges 98 is slightly greater than the spacing between stem flats 44.

With the arrangement shown and described, threaded stem portion 42 and the openings in the spring washers are cooperatively shaped for preventing relative rotation between the stem and spring washers. As clearly shown in FIG. 3, straight edges 98 are axially-spaced from outer peripheral edge 92 a distance substantially greater than the spacing between outer peripheral edge 92 and inner peripheral edge portions 94. Extensions 96 also provide a variable spring rate as they first deform axially until straight edges 98 lie in a common plane with inner peripheral edge portions 94, whereupon a new spring rate takes effect because the entire spring washer then deforms axially.

Spring washers 90a,90b are positioned with their inner peripheral edge portions engaging each other. Outer peripheral edge 92 of washer 90a engages a flat end surface on gland 58. Outer peripheral edge 92 on spring washer 90b engages a flat surface on a packing nut 100 which is threaded onto stem portion 42. With the components assembled as shown and described, packing nut 100 is tightened to move spring washers 90a,90b toward a flattened condition and apply a controlled axial force on gland 58, packing 52, and support ring 50.

A two-piece handle includes a manually graspable handle 102 and a stop plate 104. It will be recognized that the positions of the handle and stop plate can be reversed or that a one-piece handle can be provided. Stop plate 104 cooperates with upwardly extending projections on valve body B to limit rotation of stem C to 90° between the open and closed positions of the valve. Handle 102 and stop plate 104 have central openings therein generally corresponding in size and shape to the cross-sectional size and shape of stem portion 42 as shown in FIG. 2. Handle 102 and stop plate 104 rest against packing nut 100. A handle nut 106 threaded on stem portion 42 secures handle 102 and stop plate 104 to valve stem C, and a spring washer 90c is interposed between handle 102 and handle nut 106. Spring washer 90c is positioned with outer peripheral edge 92 thereof engaging a flat surface on handle nut 106 while the inner peripheral edge portions thereof engage a flat surface on handle 102.

Packing nut 100 and spring washers 90a,90b provide an axial force applying means for axially compressing packing 52 and expanding the same radially into sealing engagement with stem portion 40 and the wall of stem passage 12. Spring washers 90a,90b provide a controlled axial force to prevent overloading of the parts, particularly the packing, and also to accommodate thermal expansion.

When stem C is rotated by operation of handle 102, packing nut 100 and springs 90a,90b also rotate there-with. The firm engagement of outer peripheral edge 92 of spring 90a with gland 58 causes the gland to rotate relative to the stem passage 12. This result is due to the fact that the frictional force resisting relative rotation between gland 58 and the stem passage 12 and support ring 50 is substantially less than the frictional force between spring washer 90a and gland 58.

Tolerances and wear may cause some limited relative rotation between handle 102 and stem portion 42. In that event, handle 102 will rotate relative to spring washer 90c and no rotation will be imparted to handle nut 106. This is because the inner peripheral edge portions of spring washer 90c engage handle 102 while outer peripheral edge 92 engages handle nut 106. Due to the difference in the radius for the inner peripheral edge portions of spring washer 90c as compared to the radius of outer peripheral edge 92, less torque is required to cause rotation of handle 102 relative to the spring washer than to cause rotation of handle nut 106 or of spring washer 90c relative to the nut. It will be recognized that all of spring washers 90a,90b and 90c are identical in construction.

In the preferred form, all of the metal parts are of suitable stainless steel. In the embodiment of the invention designed for normal valve service only, packing 52 comprises Teflon, while support ring 50 is constructed of Vespel which is about fifteen percent (15%) graphite filled. However, it will be recognized that many of the features of the present invention may be used with packings and support rings of other materials, and that some or all of the metal parts may be replaced with appropriate different metals or plastic materials. Such modifications and/or substitutions may be desirable to accommodate different valve applications.

Figure 6:
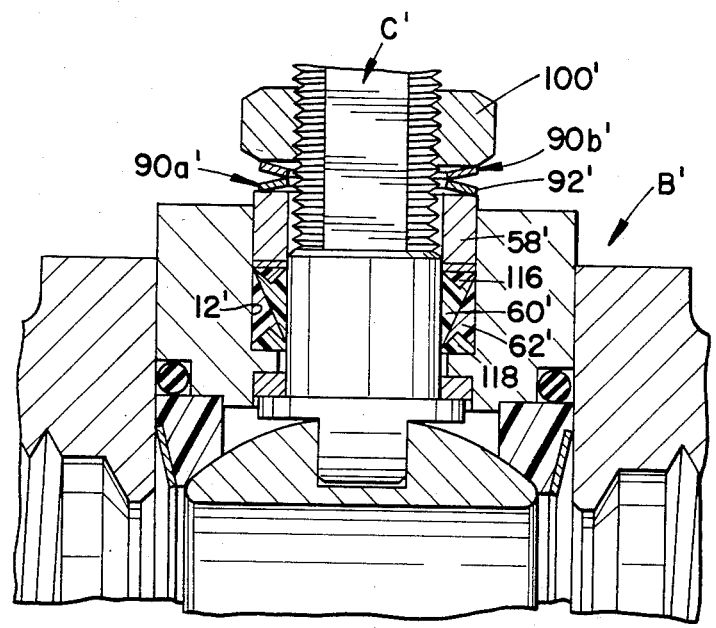
FIG. 6 is a cross-sectional elevational view of an alternate embodiment of a valve stem and packing assembly constructed in accordance with the present invention; and, FIG. 7 is a cross-sectional, exploded view in enlarged scale of the packing assembly of the stem and packing assembly of FIG. 6.
Figure 7:
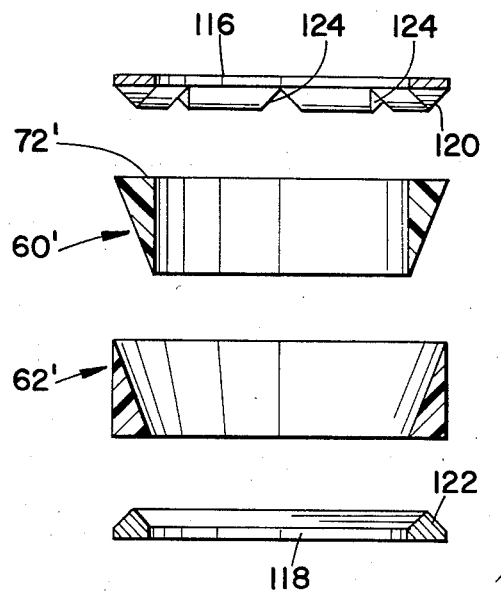

With particular attention to FIGS. 6 and 7, an alternate embodiment of the invention is there shown. Like components are identified by like numerals with the addition of a primed (') suffix and new components are identified by new numerals.

Here valve body B' and valve stem C' are sealed in valve stem passage 12' by stem packing means comprising a first packing member 60', a second packing member 62', a first packing member support ring 116 and a second packing member support ring 118. The assembly of this alternate embodiment of the invention is advantageously employed in an application designed for fire-safe use. Accordingly, the first and second packing members 60',62' are constructed of Grafoil and the first and second support rings 116,118 are constructed of Vespel. Both support rings 116,118 include Chevron surfaces 120,122 respectively, directed to the opposed packing member. The Chevron surfaces 120,122 greatly facilitate radial expansion of the packing members 60',62' without axially overloading the members. Notches 124 in first support ring 116 define gripping means for gripping one end face or end wall 72' of first packing member 60' to prevent relative rotational sliding movement between support ring 116 and the packing members.

The arrangement described for the alternative embodiment of FIGS. 6 and 7 provides a controlled slippage means for providing relative slippage between various components without having any direct rotational sliding movement relative to the end wall 72' of first packing member 60'. The controlled slippage means includes first support ring 116, gland 58' and cooperating spring washers 90a',90b'. Operation of the valve by rotation of the valve stem C', causes springs 90a',90b' to rotate with it. The firm engagement of outer peripheral edge 92' of spring 90a' with gland 58' cause the gland to rotate relative to first support ring 116. This result is due to the fact that the frictional force resisting relative rotation between support ring 116 and gland 58 is substantially less than the frictional force between spring washer 90a' and gland 58'. Where the packing members 60',62' are constructed of Grafoil, it is important that the packing support ring 116 not rotate relative to the packing members. If such rotation were to occur, the resulting slipping frictional engagement would harm the packing members and substantially lessen sealing efficiency and seal life. Thus, although the spring washers 90a',90b' provide the axial force applying means in cooperation with packing nut 100', packing members 60',62' are fixed relative to the packing support ring 116 for a controlled slippage operation between the packing support ring 116 and gland 58'.

The invention has been described with reference to alternative embodiments. Obviously, alterations and modifications will occur to others upon reading and understanding this specification. It is our intention to include all such alterations and modifications insofar as they come within the scope of the appended claims or the equivalents thereof.

Having thus described the invention, it is now claimed:

1. A valve stem packing comprising:
   a valve body having a stem passage rotatably receiving a valve stem;
   a first packing member and a second packing member axially coextensive surrounding said stem within said passage for sealing said passage against leakage of fluid therethrough, said packing members including first and second slippage surfaces being at least partially out of axial alignment for providing telescoping axial slipping engagement between said packing members;
   for translation of axial force to radial force for expansion of said packing members relative to each other radially into sealing engagement with said passage and stem;
   force applying means including spring means cooperating with said stem for imparting axial force to said packing members; and,
   a packing support ring adjacent said packing members, and a gland interposed between said force applying means and said ring, said gland being rotatable with said stem, and said packing support ring being fixed relative to said valve body for sliding engagement of said gland to said packing support ring.

2. The valve stem packing as defined in claim 1 wherein said first packing member comprises a frusto-conical packing annulus having an end wall, a first, radially-outer side wall and a second, radially-inner, side wall, said first side wall depending from said end wall towards said terminal end of said second side wall to define an angularly inclined first side wall relative to said second side wall, said second packing member mating with said first side wall for slippage engagement and the translation of axial force to radial force.

3. The valve stem packing as defined in claim 2 wherein said end wall of said first packing member engages said packing support ring.

4. The valve stem packing as defined in claim 2 wherein said end wall of said second packing member engages said packing support ring.

5. The valve stem packing as defined in claim 2 wherein said second radially-inner side wall of said first packing member sealingly engages said stem and said second radially-outer side wall of said second packing member sealingly engages said passage.

6. The valve stem packing as defined in claim 1 wherein said packing means includes a first and second support ring positioned against opposite axial ends of said packing members, said first support ring being adjacent said force applying means and having gripping means thereon for preventing relative sliding rotation between said packing members and said first ring.

7. The valve stem packing as defined in claim 6 wherein said first and second packing members comprise a flexible carbonaceous material and said support rings comprise a polyimide plastic material, said support rings including chevron surfaces engaging said packing members.

8. The valve stem packing as defined in claim 7 wherein said first support ring includes notches in the chevron surface for preventing relative sliding rotation between said first packing member and said first support ring.

9. A valve stem packing arrangement providing a long stem-sealing life without need for packing nut adjustment over a number of valve-cycling operations having, a stem passage and a valve stem received therein;

a valve stem packing about said stem comprising a bottom packing member having an inner conical surface and an upper packing member having an outer conical surface, said packing members being axially coextensive for cooperating slippage engagement with said inner conical surface and for translation of axial force imparted to said packing into radial inward and outward deformation of said members for sealing engagement to said stem and said passage;

force applying means including spring means cooperating with said stem for imparting axial force to said packing; and, a packing support ring engaging said packing, said packing support ring being fixed against rotational movement of said force applying means and said stem.

10. The stem packing arrangement as defined in claim 9 wherein a gland is interposed between said force applying means and said ring for communicating axial force to said packing, said gland being disposed for rotational sliding engagement to said ring.

* * * * *

UNITED STATES PATENT AND TRADEMARK OFFICE
CERTIFICATE OF CORRECTION

PATENT NO. : 4,558,874
DATED : December 17, 1985
INVENTOR(S) : Williams, et al.

It is certified that error appears in the above-identified patent and that said Letters Patent are hereby corrected as shown below: Claim 1, Column 10, Lines 28-53 should appear as follows:

1. A valve stem packing comprising:
   a valve body having a stem passage rotatably receiving a valve stem;
   a first packing member and a second packing member axially coextensive surrounding said stem within said passage for sealing said passage against leakage of fluid therethrough, said packing members including first and second slippage surfaces being at least partially out of axial alignment for providing telescoping axial slipping engagement between said packing members for translation of axial force to radial force for expansion of said packing members relative to each other radially into sealing engagement with said passage and stem;
   force applying means including spring means cooperating with said stem for imparting axial force to said packing members; and,
   a packing support ring adjacent said packing members, and a gland interposed between said force applying means and said ring, said gland being rotatable with said stem, and said packing support ring being fixed relative to said valve body for sliding engagement of said gland to said packing support ring.

Signed and Sealed this

Fifteenth Day of July 1986

[SEAL]

Attest:

DONALD J. QUIGG

Attesting Officer    Commissioner of Patents and Trademarks